US010766584B2

(12) United States Patent
Curutchet (10) Patent No.: US 10,766,584 B2
(45) Date of Patent: Sep. 8, 2020

(54) ROTATING MACHINES WITH FLUID ROTOR HAVING ADJUSTABLE BLADES (71) Applicant: ADV TECH, Merignac (FR)

(72) Inventor: Arnaud Curutchet, Merignac (FR)

(73) Assignee: ADV TECH, Merignac (FR)

( * ) Notice: Subject to any disclaimer, the term of this patent is extended or adjusted under 35 U.S.C. 154(b) by 644 days.

(21) Appl. No.: 15/523,411

(22) PCT Filed: Oct. 29, 2015

(86) PCT No.: PCT/IB2015/058370
§ 371 (c)(1),
(2) Date: Nov. 14, 2017

(87) PCT Pub. No.: WO2016/067251
PCT Pub. Date: May 6, 2016

(65) Prior Publication Data
US 2018/0057129 A1    Mar. 1, 2018

Related U.S. Application Data (60) Provisional application No. 62/069,982, filed on Oct. 29, 2014.

(51) Int. Cl.
B63H 1/10    (2006.01)
F03D 7/06    (2006.01)
(Continued)

(52) U.S. Cl.
CPC .............. B63H 1/10 (2013.01); B63H 1/08 (2013.01); B64C 27/54 (2013.01); F03B 17/06 (2013.01);
(Continued)

(58) Field of Classification Search
CPC .......... F03D 3/068; F03D 7/06; B64C 27/54; B63H 1/10; B63H 1/08
See application file for complete search history.

(56) References Cited

U.S. PATENT DOCUMENTS 9,841,003 B2 * 12/2017 Curutchet ............... F03D 3/068
2014/0086745 A1 * 3/2014 Kelly ..................... F03D 3/068
416/9

FOREIGN PATENT DOCUMENTS

GB    191019430 A * 11/1911 ............. F03D 3/068
GB    733087 A * 7/1955 ............... B63H 1/10

* cited by examiner

Primary Examiner — J. Todd Newton
Assistant Examiner — Sabbir Hasan
(74) Attorney, Agent, or Firm — Womble Bond Dickinson (US) LLP (57) ABSTRACT A rotating machine with a fluid rotor comprises a set of blades (4) mounted on arms (2) rotating about a main axis (1) of the rotor, the rotor being held by a support structure (5) in an orientation such that said axis (1) is essentially perpendicular to the direction of the flow of fluid, each blade (4) being mounted pivoting about a respective axis of rotation (3) parallel to the main axis (1), the machine comprising a linkage (13, 7, 14) for generating a relative rotational movement of each blade (4) relative to the arm (2) of same at the axis of rotation (3) thereof, in order to thus vary the tilt of the blade relative to the flow of fluid in an angular range. According to the invention, the machine comprises means for collectively modifying the geometry of the linkages (13, 7, 14) from a movement generated at the main axis of the rotor in order to vary the amplitude of the angular range.

8 Claims, 11 Drawing Sheets (51) Int. Cl.
- *F03D 3/06* (2006.01)
- *B63H 1/08* (2006.01)
- *F03B 17/06* (2006.01)
- *B64C 27/54* (2006.01)
- *B64C 39/00* (2006.01)

(52) U.S. Cl.
CPC ............... *F03D 3/068* (2013.01); *F03D 7/06* (2013.01); *B64C 39/003* (2013.01); *F05B 2210/16* (2013.01); *F05B 2240/923* (2013.01); *F05B 2240/931* (2013.01); *Y02E 10/28* (2013.01); *Y02E 10/74* (2013.01)

Neutral position

ROTATING MACHINES WITH FLUID ROTOR HAVING ADJUSTABLE BLADES

FIELD OF THE INVENTION

The present disclosure generally relates to fluid rotor rotary machines and more particularly to improvements to a machine having parallel axis blades with variable orientation.

PRIOR ART

Such a machine is already known from document WO 2014/006603A1 in the name of the applicant, which is capable through the use of a controlled orientation cradle, located in the vicinity of the respective axis of each blade, of controlling in a particularly simple and robust way the pitch of each blade, notably for achieving Lipp-type or Voith-Schneider-type kinematics, for use in producing wind or marine turbine power or in propelling vehicles in water or in air.

SUMMARY OF THE INVENTION

The present disclosure aims at providing a simple, robust and efficient solution for controlling the variation in the maximum pitch amplitude of the blades during the rotation of the rotor.

Thus a fluid rotor rotary machine is provided, comprising a set of blades mounted on arms rotating about a main axis of the rotor, the rotor being held by a support structure in an orientation such that said axis is essentially perpendicular to the direction of the fluid flow, each blade being pivotally mounted about a respective axis of rotation parallel to the main axis, the machine comprising a linkage for generating a relative rotational movement of each blade with respect to its arm at the rotation axis thereof, for thereby varying the pitch of the blade with respect to the fluid flow in an angular interval,
the machine being characterized in that it comprises means for collectively modifying the geometry of the linkages from a movement generated at the main axis of the rotor so as to vary the amplitude of the angular interval.

The following are certain preferred but non-restrictive aspects of this machine:
- the modification means comprise a control member capable of being displaced axially along the main axis and a set of redirection linkages respectively associated with the arms.
- the modification means are capable of displacing the anchor point of a connecting rod on a member rigidly connected to the arm and forming a crankshaft.
- the anchor points of the connecting rods are capable of being displaced for reversing the pitch variations of the blades and thus the rotation direction of the machine in response to the same flow.
- the blades are symmetrical, whereby the machine can be used in two flows of opposite directions, in particular tidal flows.
- each blade has a variable geometry actuated from an decentering member located in the vicinity of the axis of rotation of the blade and the rotation of which is synchronized with that of the rotor.
- the machine further comprises a mechanism for offsetting the linkage at a radial distance from the axis of each blade, whereby two blades in alignment on the same arm.
- the machine comprises a plurality of blade sets mounted on coaxially arranged structures, with a control linkage common to at least two blades.

Provision is also made for the use of a machine as defined above for the propulsion of a vertical takeoff aircraft.

Finally, provision is made for the use of a machine as defined above as a thruster of an aircraft or watercraft, and as a power generator when said aircraft or watercraft is stopped.

BRIEF DESCRIPTION OF THE DRAWINGS

Other aspects, objects and advantages of the present disclosure will better emerge on reading the following detailed description of preferred embodiments thereof, given by way of a non-restrictive example with reference to the appended drawings in which.

DETAILED DESCRIPTION OF PREFERRED EMBODIMENTS

In the following description, as far as possible the reference signs used in WO 2014/006603A1 will be used to designate the same elements or parts, the latter generally not being described again to avoid burdening the description. Moreover, from one figure to another, identical or similar elements or parts are designated as far as possible by the same reference signs, and will not be described again each time. A description will now be given in detail of the various devices for setting the maximum incidence of the blades according to the force of the wind in a device as described in the aforementioned document.

It will be recalled here that if in wind mode and in normal operation, it is necessary to tilt the maximum incidence of the blades to a value close to 90° to achieve high efficiency, it may prove necessary, when the nominal power of the machine is reached and the aerodynamic performance of the rotor has to be adjusted, to reduce the values of the angles of the blades.

For controlling the minimum and maximum incidence angles of the blades, and therefore modifying the setting laws in real-time, it is possible to intervene at several places in the kinematic chain, and particularly here on the variation in the position of the anchor point of the lower end of the connecting rod 13 with respect to the common axis of rotation of the cradle and the crankshaft, as mentioned in WO 2014/006603A1.

In a first embodiment, illustrated in FIGS. 1a to 1d, this anchor point is varied along a straight line (vertical in the figures) by mounting an eccentric disk 60 in the crankshaft 12 and by securing the connecting rod 13 on this disc.

By controlling the angular position of the disk 60 (by means described below), it is possible to bring the anchor point of the connecting rod 13 of the axis of rotation $0y$ of the cradle 6 and the crankshaft 12 closer together, and the amplitude of the pitch control of the blade then decreases, until it is zero if the anchor of the connecting rod 13 merges with the axis $0y$.

The position of the eccentric disc 60 may be controlled manually or automatically, by a purely mechanical system (e.g. by using centrifugal force) or with the use of electronics. The angular position of the crankshaft 12 may also be controlled in a manner coordinated with the control of the eccentric disc 60 so as to be able to displace the anchor point of the crankshaft on the vertical straight line passing through $0y$ in FIGS. 1a to 1d.

Another embodiment consists in displacing the anchor of the lower end of the connecting rod 13 by raising the anchor point on the free end of a rod 70 pivoting at its opposite end about an axis parallel to $0y$ and rigidly connected to the arm 2, as illustrated in FIGS. 2a to 2d. In this case, the anchor of the connecting rod 13 is displaced on a circular path through the axis $0y$, to achieve the same effect.

Figure 1A:
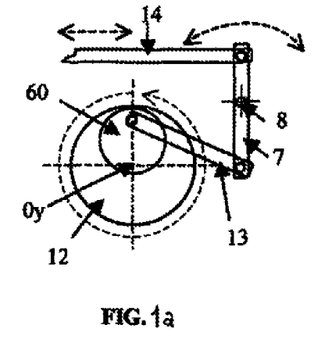
FIGS. 1a to 1d illustrate schematically and in front elevation a first mechanism for varying the angular amplitude of the pitch variations of a blade.
Figure 1B:
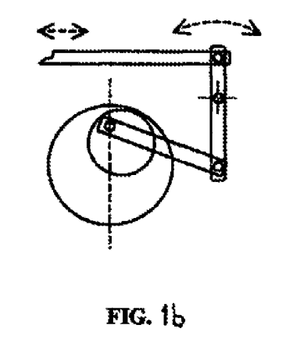
Figure 1C:
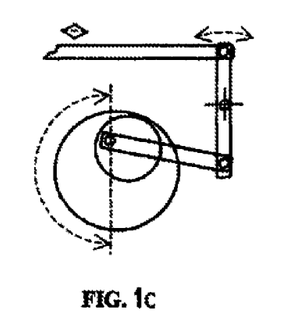
Figure 1D:
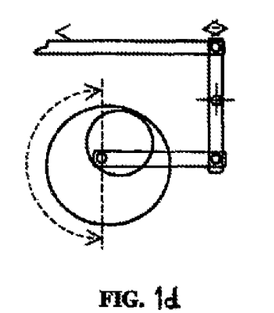
Figure 2A:
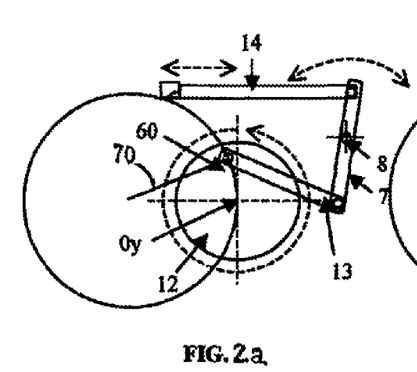
FIGS. 2a to 2d illustrate schematically and in front elevation a second mechanism for varying the angular amplitude of the pitch variations of a blade.
Figure 2B:
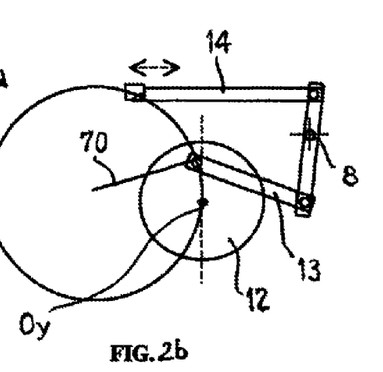
Figures 2C, 2D:
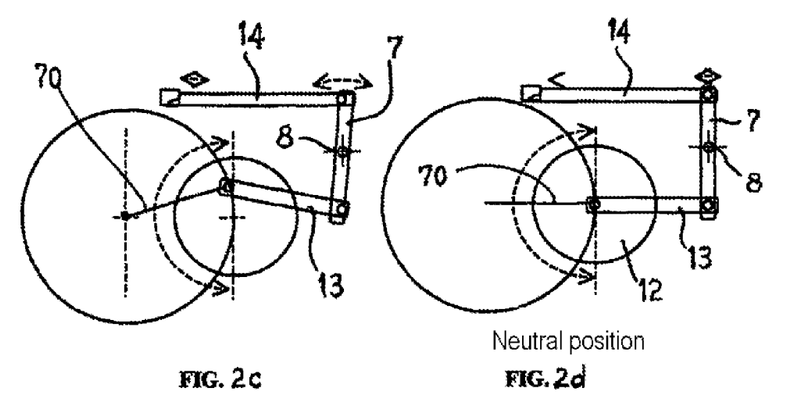
Figure 3:
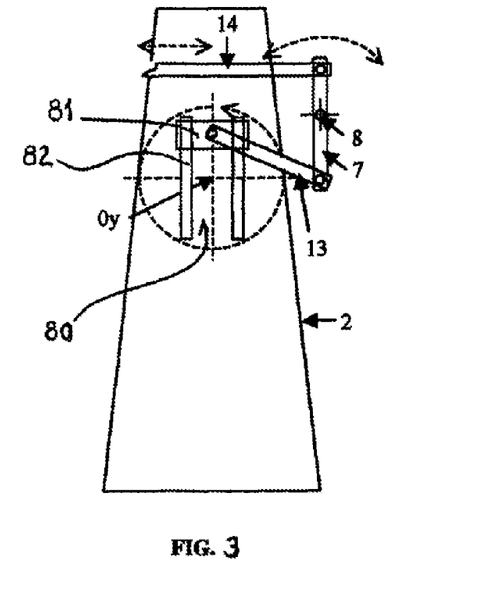
FIG. 3 illustrates schematically and in front elevation a third mechanism for varying the angular amplitude of the pitch variations of a blade.

In yet another embodiment, and as illustrated in FIG. 3 which reproduces a part of FIG. 4A of document WO 2014/006603A1, the anchor point of the connecting rod 13 is displaced in translation with the aid of a sliding means 80 comprising a carriage 81 bearing the anchor point and the displacement of which in a slide 82 is controlled as will be seen in what follows. Here again, the path of the anchor point passes through the axis $0y$.

In FIG. 3, the mechanism controlling the cradle 6 and the cradle are not represented (only the pivot shaft 8 rigidly connected the cradle is illustrated).

It will be noted here that the displacement mechanisms of the anchor of the lower end of the connecting rod 13 may be used to reverse the direction of rotation of the rotor in response to the flow of fluid. Indeed if the anchor point can occupy two diametrically opposed or substantially diametrically opposed positions with respect to the axis $0y$, then the pitches of the blade are reversed, and the machine can thus start up in one direction or the other.

In yet another embodiment, not illustrated, it is possible to act on the position of the anchor point of the link rod 14 on the blade 4: by moving this point away from the center of rotation (axis 3) of the blade, the angular amplitude of the rotation is reduced.

Figure 4:
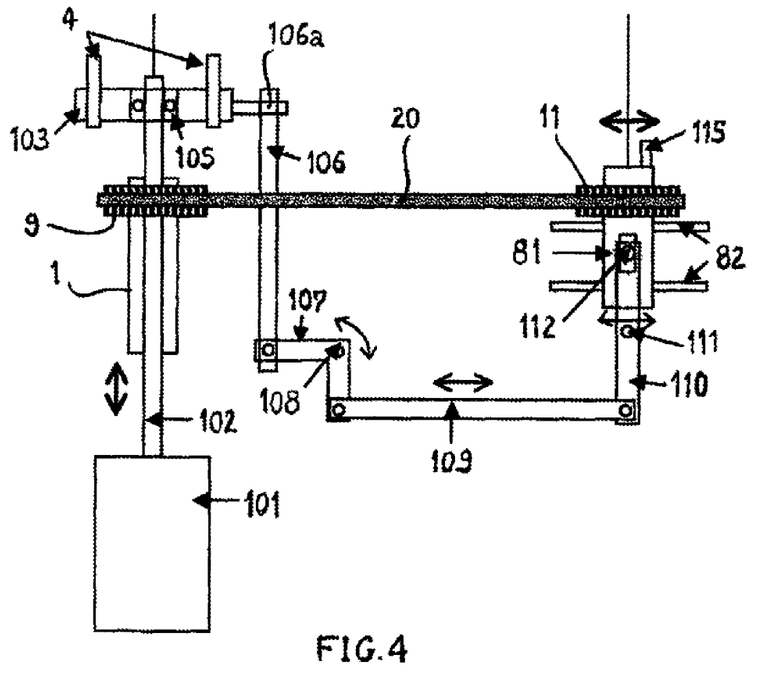
FIG. 4 illustrates schematically and in profile elevation a common control mechanism for varying the angular amplitude with the aid of a mechanism of the type in FIG. 3, FIGS. 5 and 6 illustrate in profile elevation and in front elevation an offset mechanism of the pitch control of the blades making it possible to mount two blades in alignment on the same arm, FIGS. 7 and 8 schematically illustrate in profile view a blade with variable geometry and its control, according to a development of the disclosure.

With reference to FIG. 4, a description will now be given of an embodiment of a mechanism making it possible to displace a component at the end of an arm of a rotor from a central control. This mechanism applies to the displacement of the anchor point of the connecting rod 13 on the crankshaft 12 in the embodiment in FIG. 3, but may also be applied to the displacement of any other component, notably in the context of the developments of the rotor as will be described in what follows.

A linear actuator 101 (electrical, pneumatic, mechanical, etc.) controls the translation of a shaft 102 in a housing located in the main axis 1 of the rotor. The shaft 102 makes it possible to actuate a plate 103 which slides on a set of guides 104 and which is rigidly connected to the rotating part of the rotor. According to this embodiment, since the shaft 102 is designed not to rotate with the rotor, a bearing 105 appropriately supporting the axial efforts is used for making the joint between the shaft 102 and the plate 103.

For each arm 2 of the rotor, a connection 106a is provided on the plate 103 making it possible to transmit the movement of the plate to a link rod 106. The other end of the link rod 106 is hinged to a bell crank 107 which rotates about a shaft 108 rigidly connected to the arm 2 (not illustrated) that supports the blade. Another link rod 109 is fixed on the other end of the bell crank 107, which is hinged at its other end to a bell crank 110 which pivots about a shaft 111 rigidly connected to the arm 2. A shaft 112 is mounted at the end of this bell crank 110, which slides in a hole, e.g. which is oblong, made in the carriage 81 sliding in the slide 82 here taking the form of two parallel guides rigidly connected to the arm 2. The shaft 115 is mounted at the other end of the carriage 82, constituting the lower end of the connecting rod 13.

When the actuator 101 displaces the shaft 102 in translation, the shaft 115 at the end of the arm is translated on a line parallel to the arm 2 (which extends horizontally in FIG. 4), which makes it possible to move the shaft 115 closer to or away from the center of rotation $0y$ of the mechanism of the blade thereby ensuring the desired effect of varying the angular amplitude of pitch changes of the blade during the rotation of the rotor.

A description will now be given of a number of other developments of the machine described in WO 2014/006603A1. These developments may be implemented independently of each other and independently of the control of the maximum pitch angle of the blades as described previously.

Mechanism Offset with Respect to the Extension of the Blade

Figures 5, 6:
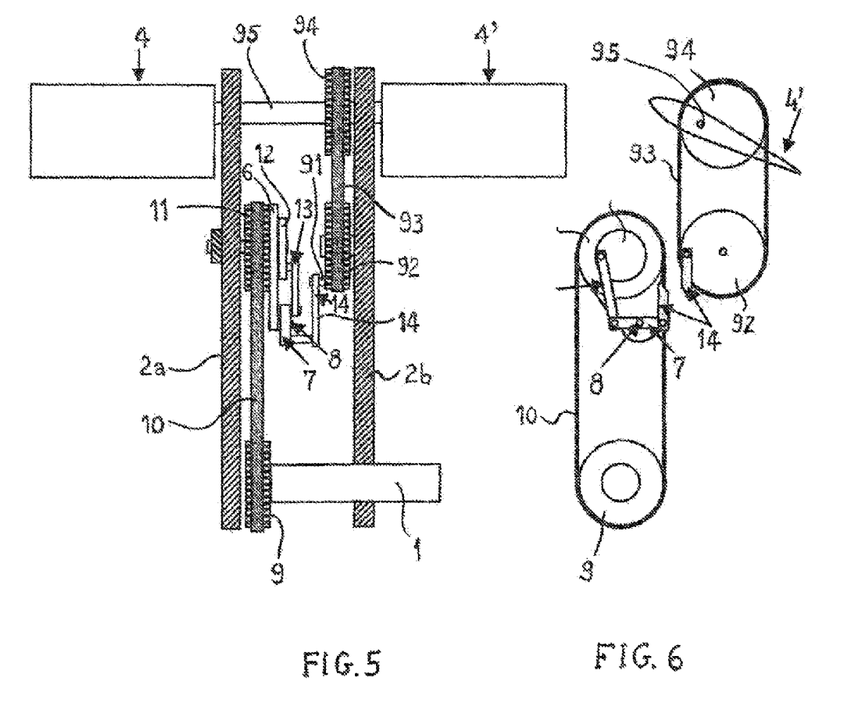

Clearly if it is desired to support two blades 4, 4' with the same arm, it is necessary to offset the orientation control mechanism of the blades. Such an offset is illustrated in FIGS. 5 and 6, where in this case the arm is subdivided into two branches 2a and 2b. This offset is achieved with the aid of a belt or chain transmission, or a set of pinions, between the link rod 14 and the blades 4 and 4'. In this case, the end of the link rod 14 opposite the cross bar 7 is connected by a shaft 91 to a first toothed wheel 92 which engages with a toothed belt 93 which in turn engages with another toothed wheel 94 rotationally fixed to a shaft 95 bearing the blades 4, 4'. In this way, the movements of the end of the link rod 14 for varying the pitch of the blades are generated at a distance from the axis of the blades 4, 4' and transferred to this axis.

It will be observed here that FIG. 6 has been broken down into two parts (see link rod 14 in two offset parts) for the sake of clarity.

The possibility will be noted of mounting a shock absorber and/or a torque limiter between the toothed wheel 94 which functions as the control horn 15 of document WO 2014/006603A1.

Control of Flaps and Slats on the Blades

According to this development, each blade 4 is provided with one or more movable parts intended to optimize its aerodynamic or hydrodynamic behavior, both in generator mode and in propulsive mode, and notably to improve the performance of the rotor.

Figure 7:
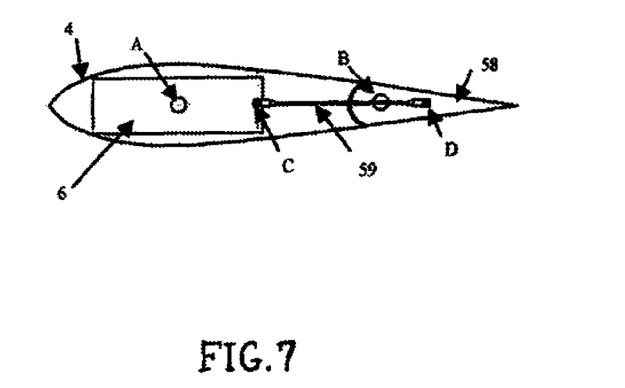
Figure 8:
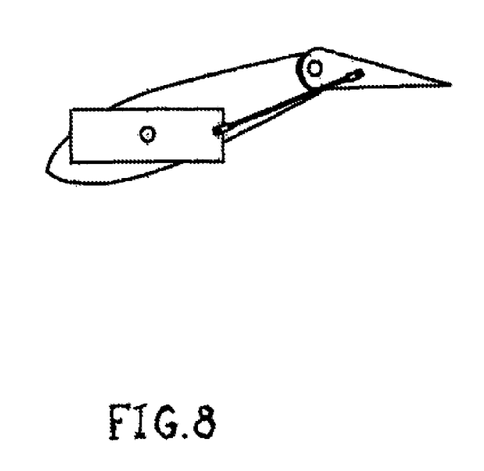

In a possible embodiment and with reference to FIGS. 7 and 8, the region of the trailing edge of the blade 4 is provided with a hinged flap 58 the pitch of which may be varied on each side of a median position giving the assembly, for example, a standard NACA profile.

The blade 4 is capable of pivoting about its shaft A, while the flap 58 pivots about a shaft B borne by the blade. A first end of a control link rod 59 is pivotably mounted at C on the cradle 6, which pivots on the shaft A, the other end of the control link rod being pivotally mounted at D on the flap 58 eccentrically with respect to its pivot shaft B. FIG. 8 depicts how the cradle 6, which in Lipp mode keeps a constant absolute orientation, can thus directly control the position of the flap 58.

It is understood that by modifying the respective positions of the shafts A, B, C and D and the length of the link rod 59, it is possible to vary the control law of the flap at will. In this regard, the linkage may be adapted so that the direction of tilting of the flap is reversed with respect to the case in FIGS. 7 and 8.

The flap may according to one embodiment consist of a single sail similar to a sailboat sail. In this case the latter may be mounted on a reel, which is an additional means for adapting the sail to the weather conditions.

On the basis of this control principle, it is possible to provide several flaps, and also one or more variable orientation slats in the region of the leading edge of the blade, for further improving the profile.

Blade in Several Parts

Figures 9, 10:
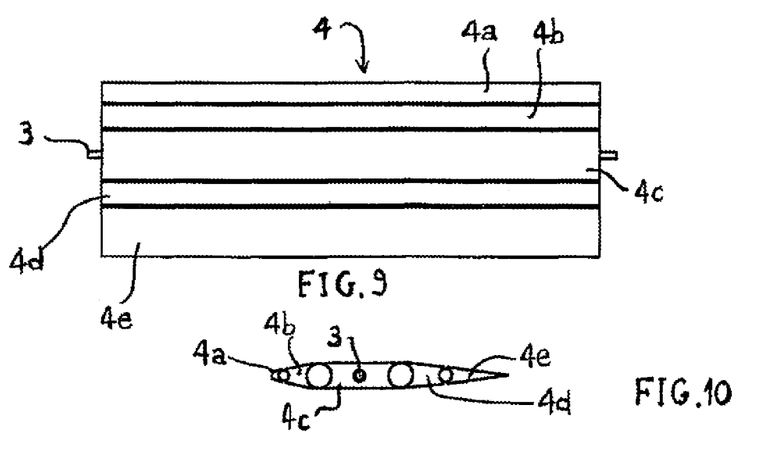
FIG. 9 illustrates a top view of a blade in several parts with variable geometry, according to another development of the disclosure.
FIGS. 10 to 12 illustrate the blade profile with three different geometries.
Figure 11:
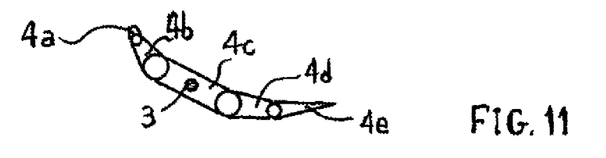
Figure 12:
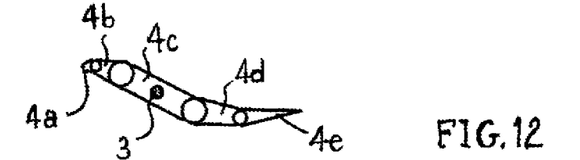

According to this development of the rotor, each blade consists of several parts mounted on hinges in the lengthwise direction. FIG. 9 depicts by way of example and schematically (without the control or the hinges) a top view of a version with a slat in two parts 4a, 4b, a main part 4c via which the blade is mounted on its shaft 3, and an aileron in two parts 4d, 4e, without these numbers being restrictive. FIG. 12 is a side view where the elements 4a-4e are arranged in mutual alignment to give the blade a basic profile, e.g. a symmetrical NACA type.

Figure 13:
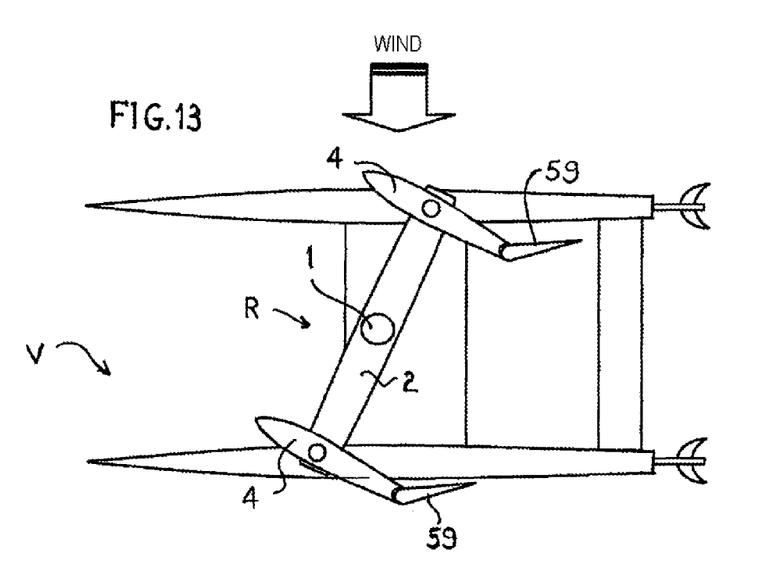
FIG. 13 illustrates a top view of a catamaran provided with a sail based on a rotor according to a development of the disclosure.
Figure 14:
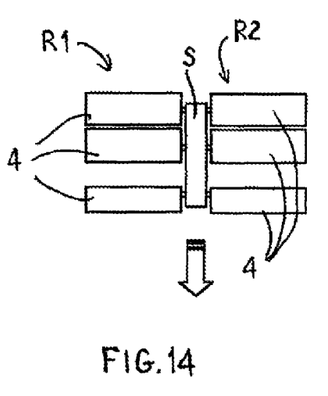
FIGS. 14 and 15 illustrate a controlled double rotor for selectively providing directional propulsion in a fluid, FIG. 16 schematically illustrates in profile view a safety solution of a rotor with two blades according to a development of the disclosure.

In FIG. 13, the profile is asymmetrical at "C" while in FIG. 14, the profile is asymmetrical at "S".

The movements of the various slats and flaps may be electronically controlled by electric actuators, or by an appropriate linkage, or by any other means based on aeronautical controls (link rod, hydraulic/electric actuator, bell cranks, cables, push rods, etc.). These various controls may be controlled from the cradle 6 or by exploiting the movement of the bell crank controlled by the connecting rod 13, or with the aid of a mechanism of the type illustrated in FIG. 4.

The central part 4c of the blade 4 is mechanically linked to the cradle 6 so that these two parts always form the same angle.

In a variant, the central part 4c may be implemented in two parts each controllably pivoting on the shaft 3.

Locking the Rotor

By locking the rotor, the latter may be used as a fixed wing of an aircraft (for achieving lift) or of a sailboat (for achieving propulsion via the sail force).

The rotor may be locked by a braking or stop mechanism acting on the rotor assembly, or by tilting the blades controlled with the control of the fixed central shaft on which the rotation transfer chains or belts are mounted.

FIG. 13 thus illustrates a top view of a catamaran-type sailboat V with a rotor R with a vertical axis comprising two blades 4 with flaps 59 mounted at the ends of a diametrical arm 2, the main parts of the blades being oriented in the tangential direction and the flaps 59 turned toward the wind. The rotor is locked at an angle here of approximately 30° with respect to the axis of the sailboat V, under a crosswind.

This configuration makes it possible to produce high-performance sailboats that may be used for leisure and pleasure and which are at the same time capable of supplying power once moored, by releasing the rotor and coupling same to a generator.

The number of onboard rotors may be varied as well as the number of blades of each rotor.

Moreover, in the absence of wind or in the case of insufficient wind, the rotor may be rotationally driven with the aid of the generator, used as an engine, or a dedicated engine, so as to move the boat by aerial propulsion, therefore without action on the water, which allows particularly silent travel.

This use of a rotor according to the disclosure applies to any boat architecture (single-hull, multi-hull, with or without foil(s)).

In the case of aircraft, there are many possible configurations. Aircraft may be designed provided with a single rotor as well as multi-rotor versions. The torque generated by the rotor or rotors is compensated, which makes it possible to establish the position of the rotors with respect to each other, and to determine their axis of rotation.

The rotor or rotors may be locked in different positions for being used as a fixed wing for increasing the lift. The blades are controlled with flaps as in the case of the sailboat.

Figure 15:
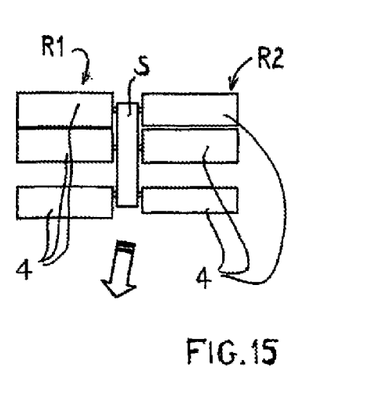

Staying with the case of an aircraft, and with reference to FIGS. 14 and 15, provision may be made for a rotor with asymmetrical adjustment, with two sets of blades (rotor parts R1 and R2) located on each side of a control and support S (arms/cradles/transmissions) arranged centrally. The setting law of the angle of the blades at the rotor part R1 is controlled independently of that of the blades at the rotor part R2. This makes it possible to orient the thrust flow either in the axis of the aircraft (FIG. 14, identical setting laws) or with an angle (FIG. 15, different setting laws with a stronger thrust at the rotor part R2), without having to modify the orientation of the rotor.

Moreover, two adjacent rotors may be coupled together sharing the same axis of rotation and rotating with opposite directions of rotation for canceling out their respective torques on the aircraft, so as to obtain with only two rotors the advantage in this respect of a quadrotor aircraft.

Provision may also be made for a mooring at altitude of a drone provided with a rotor according to the disclosure, which connected to a generator can recharge the battery of the drone and thus improve its autonomy.

A boat provided with a thruster according to the disclosure (see below) may also, moored, use the thruster for recharging the batteries of same in the presence of a sea current.

Procedures for Degrading Aerodynamic Performance to Remain at Nominal Power

The measurements carried out in a wind tunnel demonstrate that with a Lipp type of wind turbine, the maximum performance coefficient Cp is obtained for a speed ratio at the blade tip ("Tip Speed Ratio" or TSR) close to 0.6. For values of the TSR close to 0 or close to 1, the value of the coefficient Cp steeply declines down to zero. The fact that the rotor in generator mode can never exceed a TSR of 1 is an important advantage, notably for safety: if the rotor is fully released (e.g. in case of failure of the transmission between the rotor and the generator), it will never race.

To achieve this object (in a wind turbine application), several approaches are possible:
  reducing the angles of the blades, with the aid of one of the mechanisms described above, and/or modifying their geometry in the case of blades in several hinged parts,
  braking the machine by increasing the load on the generator,
  releasing the rotor by reducing the load on the generator (the simplest solution), so that it takes more revolutions per minute, with a consequent reduction in the Cp (a solution that may be combined with a reduction in the angle of incidence of the blades).

Emergency Procedures—Stopping Through Strong Wind

The procedures for stopping the rotor may be diverse and closely dependent on the architecture of the rotor to which they apply. The solutions are notably:
  braking the rotor then feathering (releasing) the blades with the aid of a disengaging mechanism (together or one after the other);
  braking the rotor then locking the blades in a forced position facing the wind.

Figure 16:
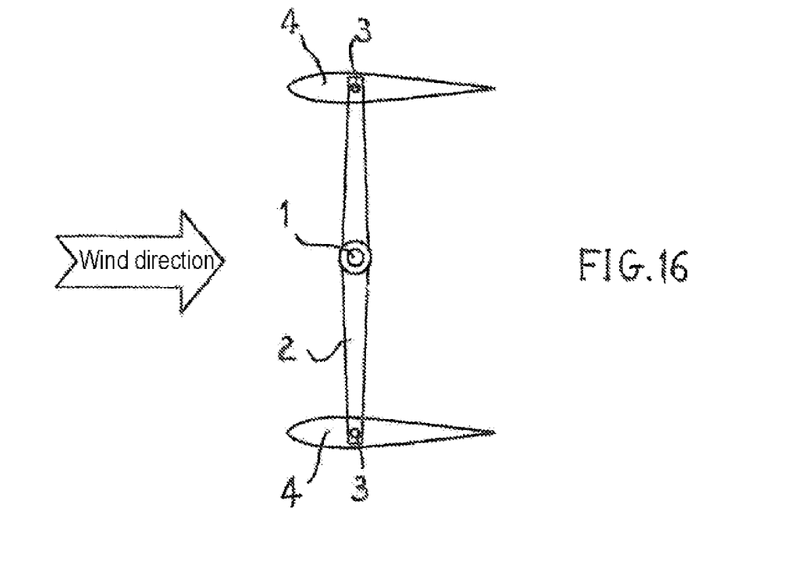

In a version with one or two blades, it is also possible to lock the rotor in the position for which the two blades remain facing the wind, as illustrated in FIG. 16. This solution makes it possible to simplify the rotor since the control mechanisms of the extreme pitch angles of the blades may optionally be done away with.

In versions of rotors possessing more than two blades, feathering the blades or reducing the pitch of the blades with the aid of one of the mechanisms described above is more appropriate.

Similar emergency procedures may be used for recovering the energy of river or sea currents, in case of an abnormally high current.

Bidirectional Machine

According to another embodiment, e.g. in the case of a marine or river turbine generator application, it is possible to maintain the machine in a fixed manner (perpendicular) with respect to the direction of the flow and therefore to dispense with the system of orienting the blades with respect to the direction of the flow: indeed, in a first direction of the flow (e.g. when the tide goes out), the rotor rotates in one direction, and in the opposite direction of the flow (when the tide comes in), the rotor rotates in the other direction. In this case, it may seem appropriate to fix the axis of rotation 3 of each blade 4 in the middle of the blade and use a symmetrical blade profile not only at the upper and lower surface, but also at the leading edge and trailing edge (e.g. a flattened elliptical shape). Even if the overall performance of the machine may be reduced, the implementation is greatly simplified and made more economic.

Producing the Blades

Wing-mast techniques may be used e.g. of the type developed for water sports. One approach consists in assembling a framework around the mast and creating a skin on this framework with the materials used for producing conventional sails (canvas, Mylar®, etc.). This technique therefore makes it possible to give volume to the wing-mast, and produce all kinds of profiles, e.g. NACA18. This technology therefore makes it possible to make blades of large dimensions with a reduced weight.

Figure 17:
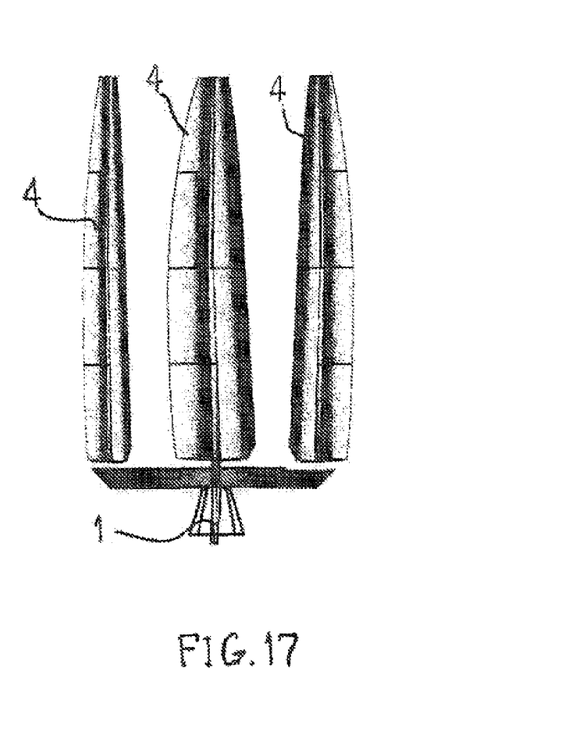
FIG. 17 illustrates a possible practical arrangement of the blades of a vertical axis rotor according to a development of the disclosure.

FIG. 17 thus illustrates a vertical axis wind turbine with three wing-mast type blades 4 as mentioned above.

Wind Turbine Applications, Provision of Architecture

Although wind turbines according to document WO 2014/006603A1 or according to the improvements described here may have versions in horizontal mode, operation in vertical mode has many advantages. Indeed, in this configuration, the generator may be mounted the lowest, which represents a clear advantage for off-shore applications since the center of gravity is thus lowered. In addition, the orientation of the blades facing the wind is facilitated as mentioned above. The configurations provided below are given for vertical axis versions but may, of course, have horizontal axis versions.

Figure 18A:
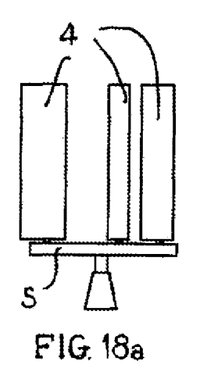
FIGS. 18a to 18c illustrate in schematic elevation possible support architectures for a vertical axis rotor with one stage of blades.
Figure 18B:
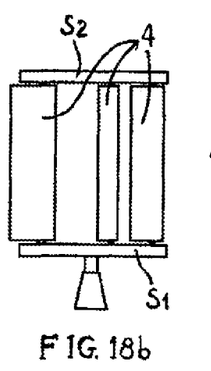
Figure 18C:
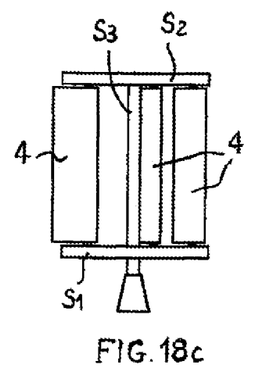
Figures 19A, 19B:
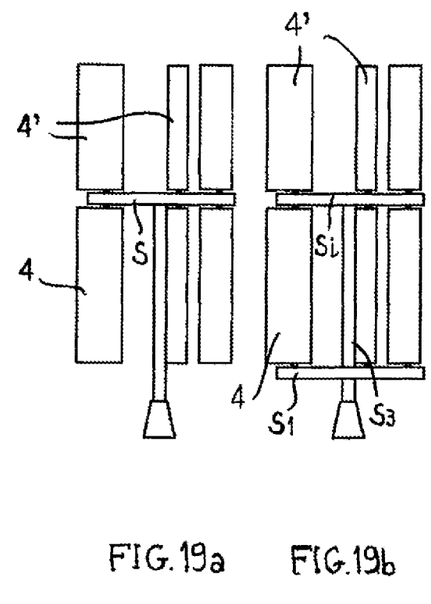
FIGS. 19a to 19j illustrate in schematic elevation possible support architectures for a vertical axis rotor with two or three stages of blades.
Figures 19C, 19D:
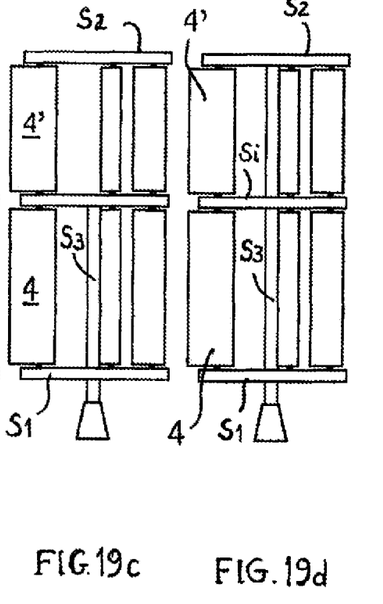
Figure 19E:
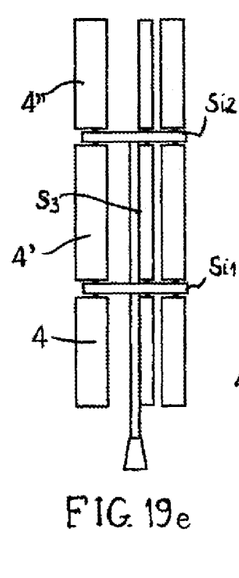
Figure 19F:
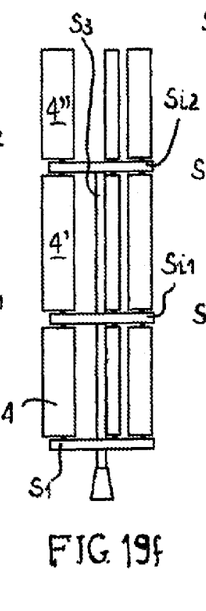
Figure 19G:
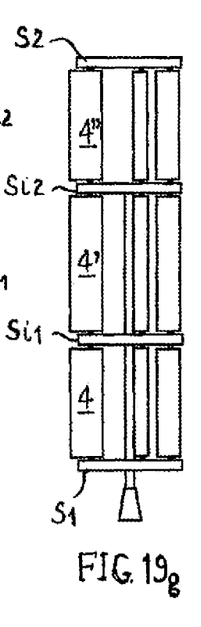
Figure 19H:
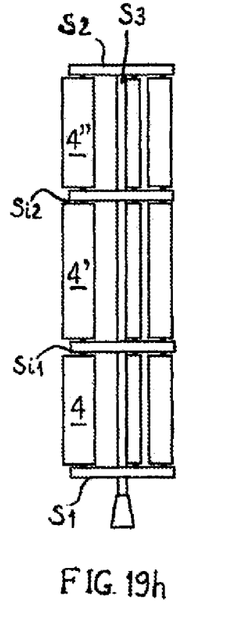
Figure 19I:
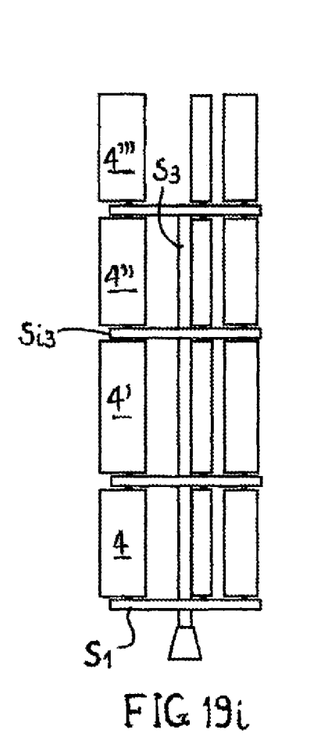
Figure 19J:
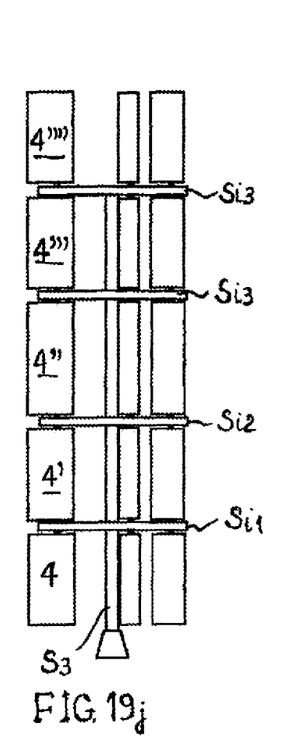
Figure 20:
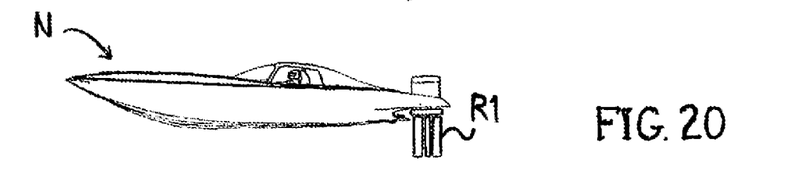
FIG. 20 illustrates schematically from the side a propulsion vessel based on a vertical axis rotor, and FIG. 21 schematically illustrates from the side a propulsion vessel based on a horizontal axis rotor.
Figure 21:
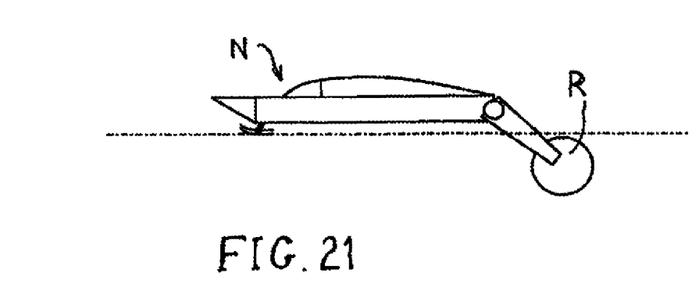

Thus:
  FIG. 18a illustrates an embodiment with single blades 4 mounted cantilevered upwardly from a support and control structure S,
  FIG. 18b illustrates an embodiment with single blades 4 held at their two ends by two support structures S1 and S2, one of which (preferably that situated at the bottom) is provided with control means for tilting the blades, and
  FIG. 18c illustrates an embodiment with single blades held at their two ends, with a central shaft S3 connecting the end structures S1 and S2.

Many other configurations are possible, as illustrated in FIGS. 17a to 17j, with two or three stages of blades (4, 4'; 4, 4', 4"; etc.) or even more, and different distributions of structures between a lower structure S1, one or more intermediate structures Si; SiN and an upper structure S2, with a structural shaft S3 where appropriate.

It will be noted that similar architectures may be considered for wind turbines.

Application to Vessel Propulsion—Provision of Architecture

A preferred solution for vessel propulsion consists in using two vertical axis rotors rotating in opposite directions in order to cancel out their respective torques. The correlated or independent control of the two rotors makes it possible to steer the vessel in different directions and thus to do away with the rudder or rudders, reverse gears or bow thrusters.

FIG. 18 is a side view of the vessel N with two vertical axis rear rotors R1, R2 (only one being visible).

FIG. 19 illustrates a version where the rotor R is oriented with its axis of rotation horizontal. Trim adjustment is possible by rotating the structure about its horizontal axis. A rudder is necessary in this case, at least if a single rotor is provided, for steering the vessel.

Application to Aircraft Propulsion: Vertical Takeoff/Horizontal Flight

A vertical takeoff and landing (VTOL) aircraft is a fixed-wing aircraft designed for dispensing with the runways that are normally necessary for takeoff and landing. This type of airplane is sometimes called hybrid or convertible, notably in the case of airplanes with "tilt-rotor" type tilting engines.

The moment during which a VTOL aircraft passes from vertical flight to horizontal flight at the end of takeoff, or from horizontal flight to vertical flight before landing, is called "transition". The first transition is very tricky since the lift has to be transferred from the engines to the wings; but the wings only perform their function on condition that the horizontal speed of the aircraft is sufficient. The tilting therefore takes place gradually.

The rotors according to WO 2014/006603A1 or according to some improvements described here make it possible to easily orient the flow in any desired direction: they are therefore very suitable for producing vehicles capable of taking off (and landing) vertically and passing into horizontal flight mode. Via a combination of several rotors controlled in rotation speed and/or in setting laws, it is possible to control the thrust in an additional plane. As mentioned above with reference to figure XX, the same rotor with separate control of the setting laws to the right and left makes it possible to do so. A single engine can drive two of these rotors in opposite directions (for canceling out the torque) and control them separately, which makes it possible to handle hovering flight.

In addition, the low speed of rotation compared with the propellers of conventional VTOL aircraft makes it possible to produce quieter aircraft.

Moreover, the disclosure makes it possible to produce drones capable on the one hand of moving thanks to the rotors, but also of recharging their batteries via these same rotors used as wind turbines once they have landed. This solution makes it possible to consider missions over very long periods and over long distances.

In the same way, watercraft or underwater vehicles of great autonomy may be produced. With regard to submarines, the low speed of rotation of the rotors makes them almost undetectable.

The invention claimed is:

1. A fluid rotor rotary machine comprising a set of blades (4) mounted on arms (2) rotating about a main axis (1) of a rotor, the rotor being held by a support structure (5) in an orientation such that said main axis (1) is essentially perpendicular to a direction of a fluid flow, each blade of the set of blades (4) being pivotally mounted about a respective rotation axis (3) parallel to the main axis (1), the machine comprising a linkage (13, 7, 14) for generating a relative rotational movement of each said blade (4) with respect to its corresponding arm (2) at the rotation axis (3) thereof, and varying the pitch of each said blade with respect to the direction of the fluid flow in an angular interval, wherein the machine comprises means for modifying a geometry of the linkage (13, 7, 14) from a movement generated at the main axis of the rotor so as to vary the amplitude of the angular interval.

2. The machine as claimed in claim 1, in which the modifying means comprises a shaft axially displaced along the main axis (1) and a set of redirection linkages (106-110) respectively associated with corresponding one of the arms (2).

3. The machine as claimed in claim 1, in which the modifying means are for displacing the anchor point of a connecting rod (13) on a member (12) rigidly connected to a respective one of the arms (2) and forming a crankshaft.

4. The machine as claimed in claim 3, in which anchor points of the connecting rods (13) are capable of being displaced for reversing the pitch variations of each of the blades and thus the rotation direction of the machine in response to the direction of the fluid flow.

5. The machine as claimed in claim 1, in which the blades are each symmetrical to enable the machine usable in two fluid flows of opposite directions.

6. The machine as claimed in claim 1, wherein each said blade has a variable geometry actuated from an eccentric disk located in the vicinity of the axis of rotation of one of the blades and the rotation of which is synchronized with that of the rotor.

7. The machine as claimed in claim 1, further comprising a shaft (92-95) for offsetting the linkage at a radial distance from the axis of each said blade, whereby two of said set of blades can be mounted in alignment on a single one of said arms.

8. The machine as claimed in claim 1, comprising a said plurality of blade sets mounted on coaxially arranged structures, wherein said linkage is common to at least two blades said set of blades.

\* \* \* \* \*